Figure 1:
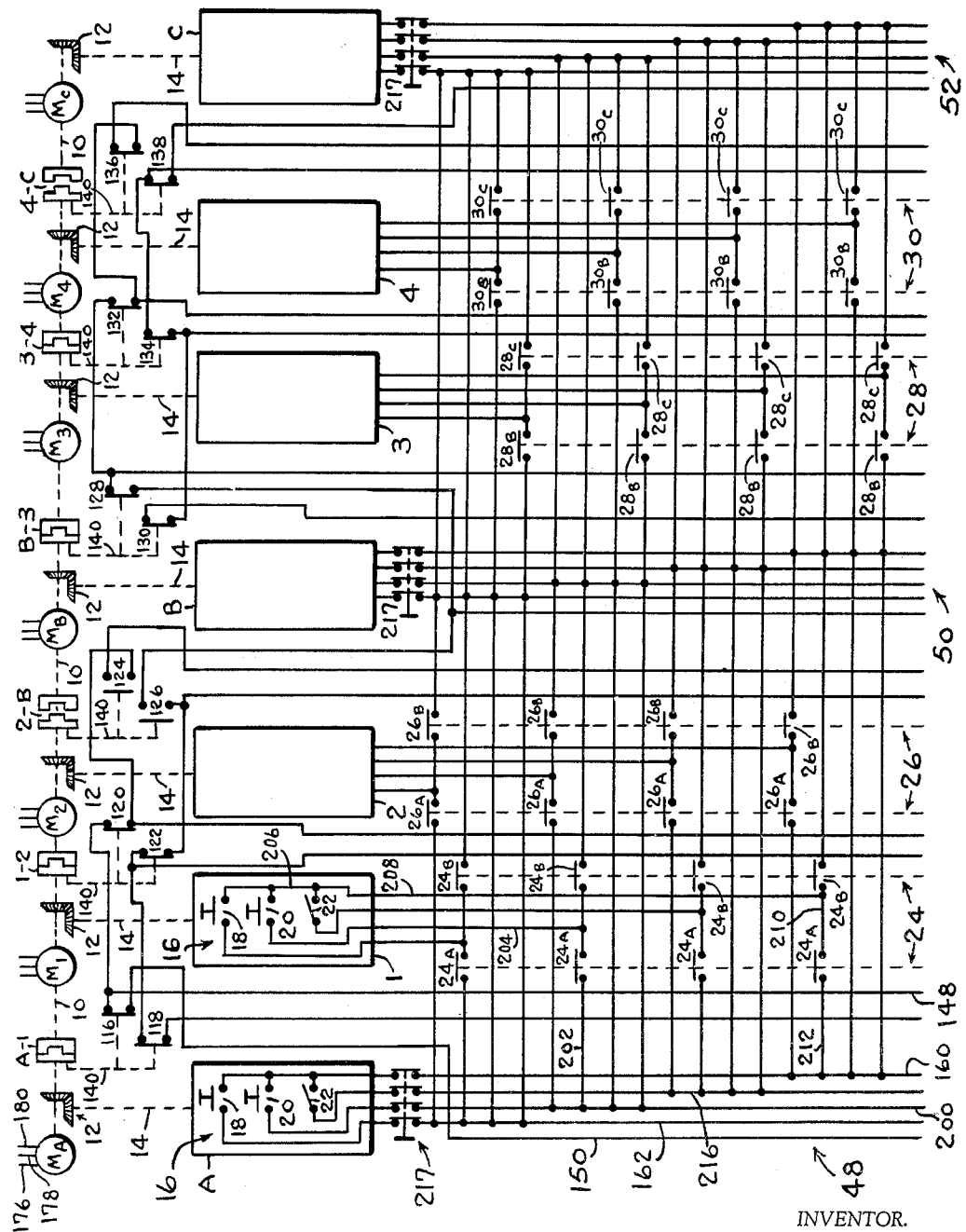

April 11, 1961 W. H. ROUSE 2,979,646
CONTROL SYSTEMS FOR MOTOR DRIVEN MACHINES OF MULTI-UNIT TYPES
Filed Aug. 6, 1957 5 Sheets-Sheet 1

INVENTOR.
WILLIAM H. ROUSE
BY H.R. Ratter
ATTORNEY

INVENTOR.
WILLIAM H. ROUSE
BY H. R. Rather
ATTORNEY

United States Patent Office 2,979,646
Patented Apr. 11, 1961

2,979,646

CONTROL SYSTEMS FOR MOTOR DRIVEN MACHINES OF MULTI-UNIT TYPES

William H. Rouse, Brookfield, Wis., assignor to Cutler-Hammer, Inc., Milwaukee, Wis., a corporation of Delaware Filed Aug. 6, 1957, Ser. No. 676,550

6 Claims. (Cl. 318—5)

This invention relates to control systems for motor driven machines of multi-unit types and is particularly applicable to multi-unit newspaper printing presses.

Modern multi-unit machines used for printing newspapers and similar products usually have their printing units and folders arranged in alignment with several printing units between folders, and a plurality of motors for driving the units and folders so that a printing press may be operated as several separate printing groups, each such separate group including a folder and the number of printing units required for the work at hand.

It is extremely desirable in a metropolitan type newspaper printing press that at all times a maximum number of units be available for use and that complete flexibility of operation be provided. One problem has been that upon the occurrence of a grounding or shorting fault in the control equipment for the motor drive of a particular unit not only is the particular unit incapacitated but other units are incapacitated as well. Further problems have been experienced in systems which rely on a chain of contacts where one bad contact may render all control circuits beyond the faulted switch unusable.

It is an object of this invention, therefore, to provide a control system in which the control equipment of each unit can be isolated without disturbing the control circuits of the other units to thereby maintain maximum capacity at all times.

Another object is to provide a control system with simplified control circuits to increase reliability and decrease cost.

Another object is to provide a control system which prevents a unit being mechanically connected to one folder while electrically controlled from another folder.

Another object is to provide a control system which prevents the operation of a group when there are more than one folder mechanically connected in such group.

Another object is to provide a control system which can transfer the control and operation of the printing units intermediate two folders to the driver controller of a remote folder to thereby create a group which includes a greater number of units with increased capacity for such group.

In the accomplishment of these objects each control station for each unit is separately electrically connected alternatively to the controller circuit from the control station of a folder on one side of the unit and the controller circuit from the control station on the folder on the other side of the unit. The selection is made by manually operable supervisory switches which may be located apart from the units. The supervisory switches have an intermediate off position. Hence each unit is isolated and may be shifted under supervisory control to form desired groups. Once a group is set, the controllers for the drivers in such group are jointly operated from any of the control stations on a folder or on the units of such group.

Each driver for a folder or a unit is mechanically connected to the driver on each side thereof through drive shaft clutches. These clutches operate switches which (a) prevent the control station of a unit which is mechanically disconnected from the driver of a folder from being electrically connected to the controller circuit from such folder; and (b) prevent the electrical energization of the control circuits from the control stations when more than one folder is mechanically coupled in a single group.

By using skip folder switches which alternately connect the control stations of the units intermediate two adjacent folders to the controller circuit from one adjacent folder and the controller circuit from a remote folder, additional units may be incorporated in a single group when desired for printing color or other like uses.

Figure 2:
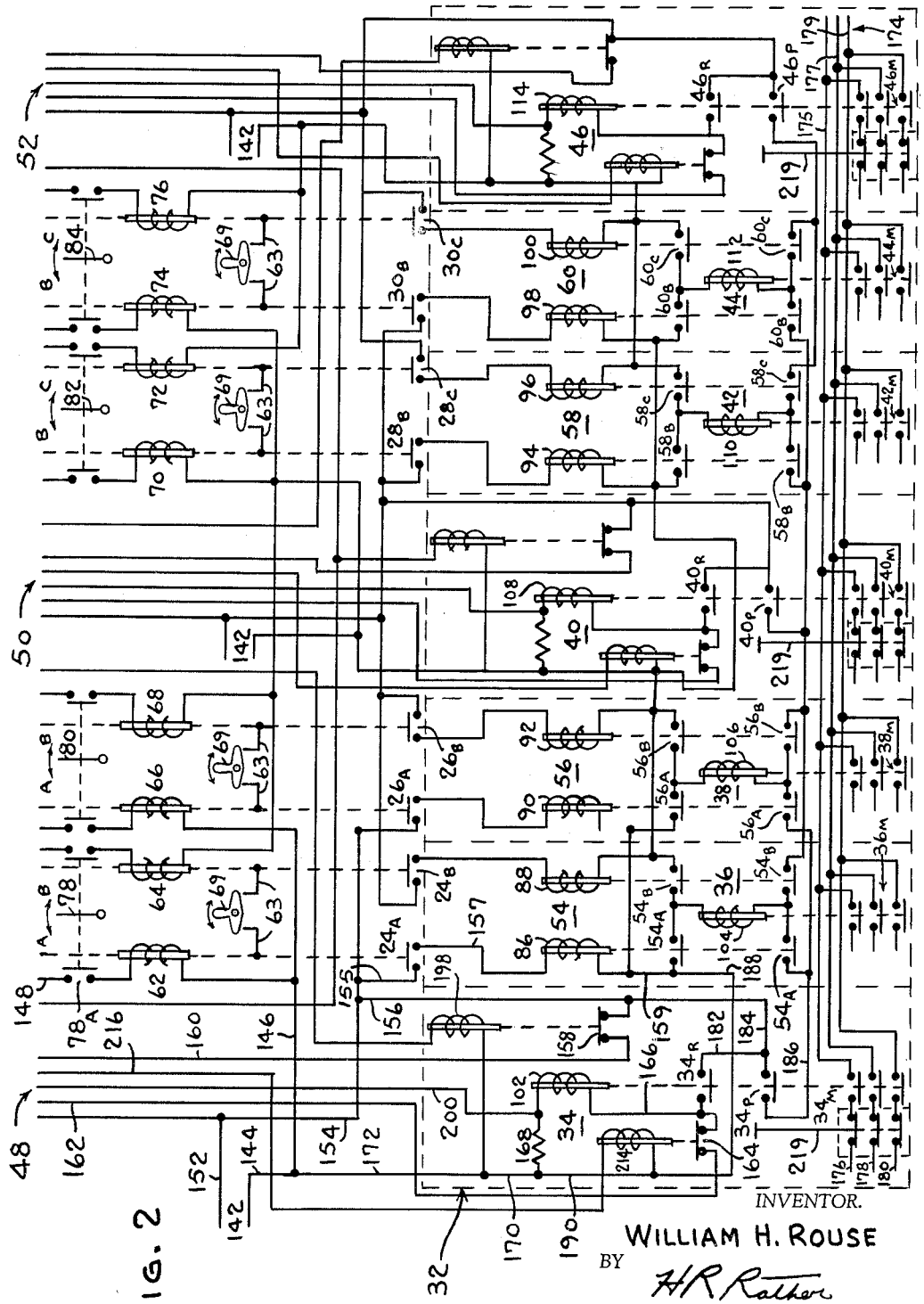
Figure 3:
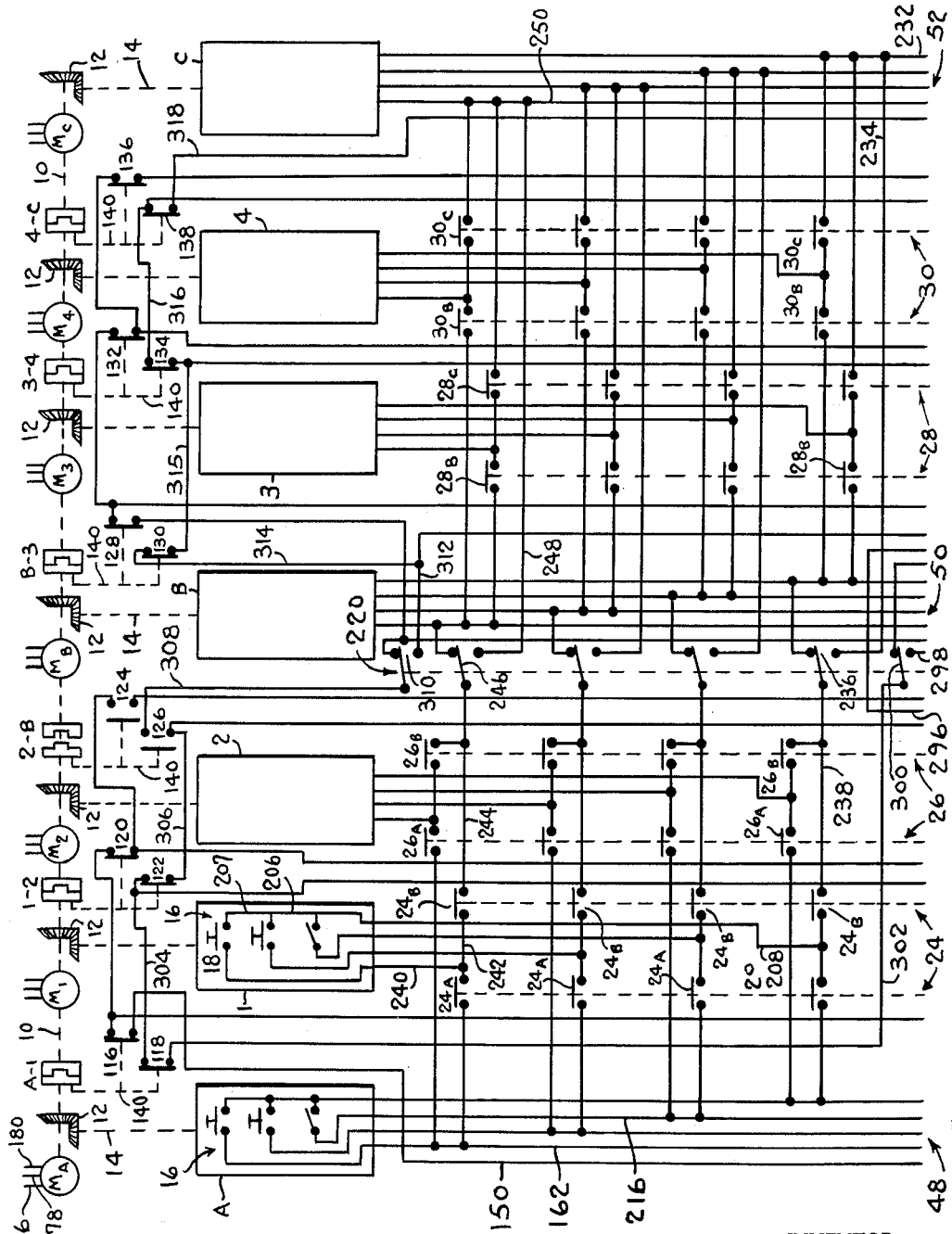
Figure 4:
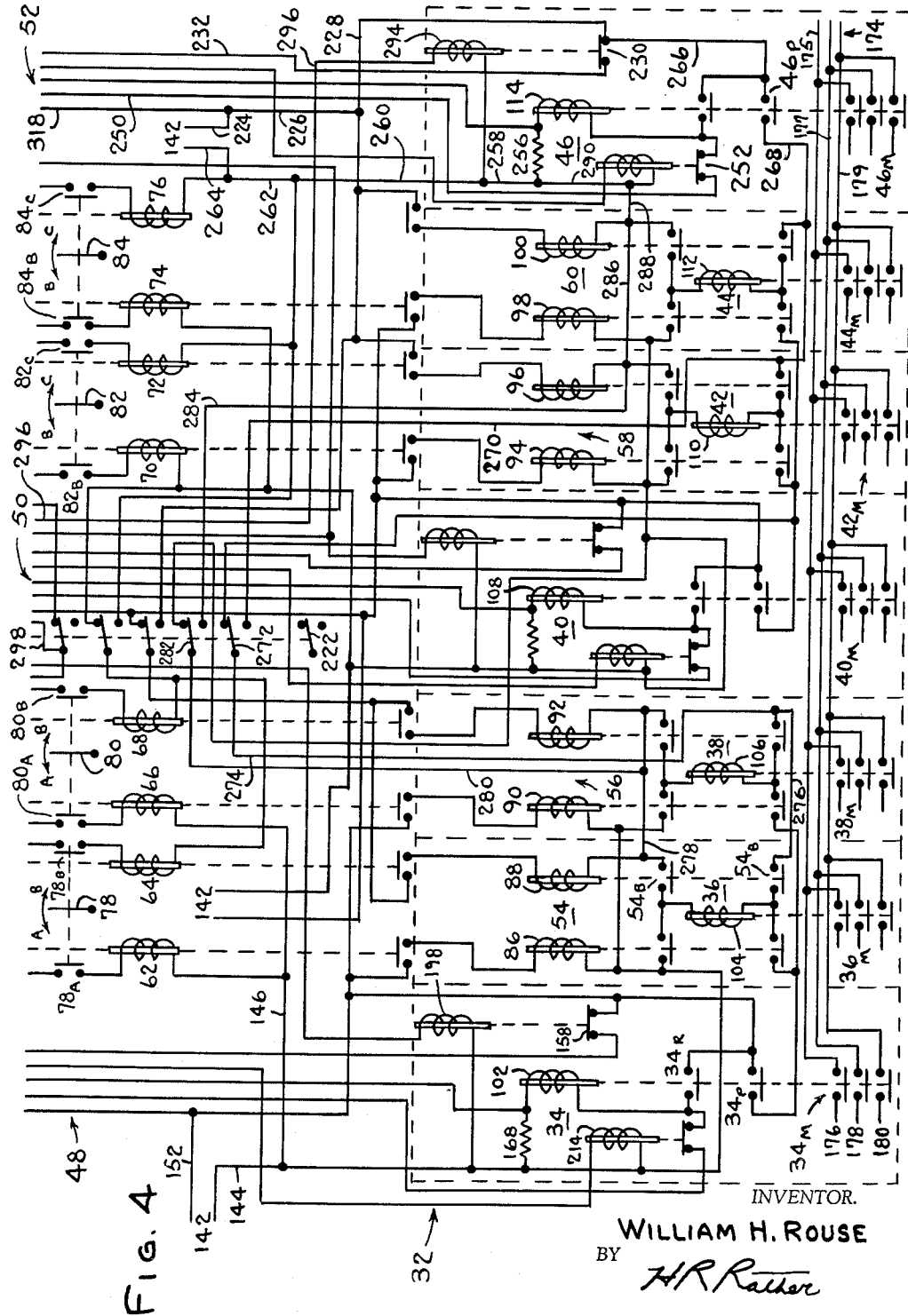
Figure 5:
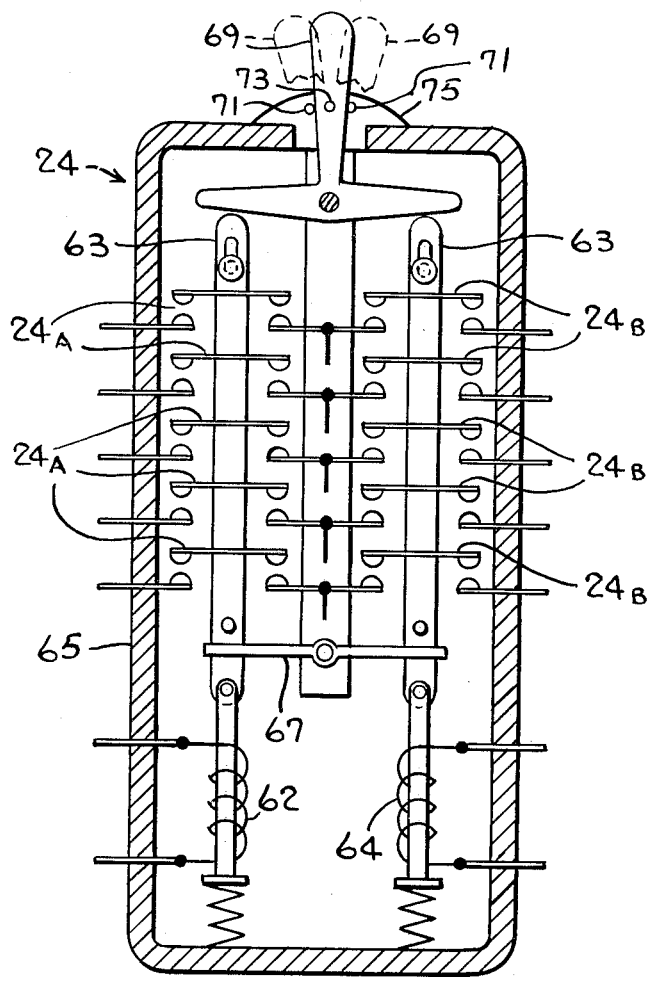

Practical embodiments of the invention as applied to a multi-unit newspaper printing press are illustrated in the accompanying drawing, wherein:

Figs. 1 and 2, taken together, show a simplified wiring diagram and schematic layout of a printing press control system embodying the present invention;

Figs. 3 and 4, taken together, show a simplified wiring diagram and schematic layout of a modified printing press control system particularly adapted for printing color; and Fig. 5 is a partially schematic cross-sectional view of a selector switch used in the printing press control system.

Referring now to the drawings, the simplified schematic layout and wiring diagram of Figs. 1 and 2 shows a control system embodying the present invention applied to a metropolitan type printing press. Such press has a line of four printing units 1, 2, 3 and 4 interspersed between three folders A, B and C. The printing units of a metropolitan type press ordinarily are designed to print eight pages and the press frequently includes as many as four folders with four or more printing units for each folder. For purposes of simplicity and clarity, however, only two printing units are shown spaced between each of three folders. It should be understood that the features of the control system hereinafter described apply equally well to arrangements which include additional printing units and folders.

A plurality of drives are provided whereby the units and folders may be driven in groups. In the arrangement shown (Figs. 1 and 2), printing units 1 and 2 can be operated individually or together into either folder A or B. Similarly, units 3 and 4 can be operated together into either folders B and C or individually into either of these folders. Each unit and folder is equipped with its own drive motor $M_A$, $M_1$, $M_2$, $M_B$, etc. connectible to the folders and units by a common drive shaft 10, bevel gears 12 and power take-off shafts 14. Other drive arrangements could be employed, as, for example, in a "group drive" in which one large motor replaces several unit motors. The printing units may be selectively disengaged from drive shaft 10 by disengagement of bevel gears 12 or other suitable means. A series of drive shaft clutches A–1, 1–2, 2–B, B–3, etc. are provided between each drive motor and associated bevel gears to drive each folder and its adjacent units as a separate group. For example, as illustrated in Figs. 1 and 2, by closing clutches A–1 and 1–2 and opening clutch 2–B folder A and units 1 and 2 may be driven as a unit or group from drive shaft 10 by motors $M_A$, $M_1$ and $M_2$. Similarly, by closing clutches B–3, 3–4 and opening clutch 4–C folder B and units 3 and 4 may be driven as a group from shaft 10 by motors $M_B$, $M_3$ and $M_4$. Other combinations of folders and units can be established by manipulation of the drive shaft clutches and disengagement of bevel gears 12. The number of possible combinations increases, of course, with the number of folders and units present in a particular printing press.

At each folder and unit is a control station 16 which includes normally open start and stop switches 18 and 20, respectively, and a maintained contact safe switch 22. The start, stop and safe switches and associated circuitry of the control stations 16 are shown only at folder A and unit 1 since they are identical for all folders and units. The control circuitry shown and presently to be described has been greatly simplified over that normally employed in equipment of this type. It is conventional in practice to supplement the basic circuits shown with additional circuits for inching, signalling, speed adjustment, signal lights, web sensing and electro-mechanical brakes. The start, stop and safe-lock circuits shown are representative and embody the features of my invention.

Adjacent the printing units are mounted selector switches 24, 26, 28 and 30 shown schematically in Figs. 1 and 2 and in detail on Fig. 5. The selector switches which are of identical construction have two sets of contacts designated A and B for the selector switches 24 and 26 and B and C for selector switches 28 and 30. Selector switches 24, 26, 28 and 30 each have a pair of solenoids 62 and 64 for switch 24, 66 and 68 for switch 26, 70 and 72 for switch 28, and 74 and 76 for switch 30.

Fig. 5 shows the construction of selector switch 24 with separate banks of contacts $24_A$ and $24_B$ actuated by solenoids 62 and 64. The banks of normally open contacts $24_A$ and $24_B$ are actuated by solenoids 62 and 64, respectively, by means of double-throw switch poles 63 slidably mounted in a housing 65 and equipped with a mechanical interlock 67. A lever 69 pivotally mounted in the switch housing and extending from an opening therein provides means for manual operation of the switch and can be locked in any of its three positions by means of aligned openings 71 and 73 in locking plate 75 and lever 69, respectively.

At any convenient location, such as the press control room, is a controller assembly 32 which includes a motor controller for each folder motor comprising a power contactor, a hold relay, and a safe relay for the simplified control system shown. The folder motor power contactors are designated by numerals 34, 40 and 46. The printing unit motor controllers comprise a power contactor only designated 36, 38, 42 and 44. Also included in controller assembly 32 are auxiliary selector switches 54, 56, 58 and 60 associated with printing unit power contacts 36, 38, 42 and 44, respectively.

Control busses 48, 50 and 52 connect the control stations at folders A, B, and C with the folder drive motor controllers which control folder drive motors $M_A$, $M_B$ and $M_C$. The selector switches at each printing unit control station serve to transfer these control stations between one or the other of the adjacent control busses. For example, selector switch 24 transfers the unit 1 control station between control busses 48 and 50. Similarly, selector switch 28 at the unit 3 control station transfers that control station between control busses 50 and 52.

The solenoids for actuating the selector switches are controlled by manually operated supervisory switches 78, 80, 82 and 84. These supervisory switches may be located remote from the press, so that grouping of the printing units and folders can be established in a supervisor's office, for example, or other convenient location. The supervisory switches, as will be explained hereinafter, also permit the control of a single unit to be isolated from the balance of the system in case of trouble.

The power contactors 36, 38, 42 and 44 for the printing unit drivers are transferred between their adjacent control busses by auxiliary selector switches 54, 56, 58 and 60. For example, auxiliary selector switch 54 transfers power contactor 36 for drive motor $M_1$ between control busses 48 and 50. The auxiliary selector switches 54, 56, 58 and 60 each comprise a pair of solenoids 86, 88, 90, 92, etc. and a set of A and B contacts for each of the auxiliary selector switches 54 and 56 and a pair of B and C contacts for each of the selector switches 58 and 60. As will be explained more fully hereinafter, operation of the auxiliary switches is controlled by the selector switches so that both the control station and power contactor for any printing unit will be connected to the same control bus.

Power contactors 34, 36, 38, 40, 42, 44 and 46, include a solenoid for each contactor designated 102 through 114, respectively, which operate sets of contacts $34_M$, $36_M$, $38_M$, $40_M$ etc. which control the operation of the drive motors. The solenoids of power contactors 34, 40 and 46 which control the drive motors for folders A, B and C each operate two additional sets of contacts $34_R$ and $34_P$ for contactor 34 etc. Contacts $34_R$, $40_R$ and $46_R$ set up a maintaining or holding circuit for solenoids 102, 108 and 114 and contacts $34_P$, $40_P$ and $46_P$ serve as pilot contacts to control the operation of the printing unit power contactors as will be explained more fully hereinafter.

Drive shaft clutches A–1, 1–2, etc. control the operation of clutch contacts 116 and 118 for clutch A–1, 120 and 122 for clutch 1–2, etc. These clutch contacts, as shown are operated mechanically through linkages 140 which will open each set of contacts when their associated clutch is opened and will close such contacts when the clutch is closed to prevent a unit being mechanically connected to one folder but operating electrically from another and to prevent operating the press when two folders are mechanically coupled together. While a mechanical linkage is shown between the clutches and clutch contacts is should be understood that the clutch contacts could be controlled by an intermediate set of pilot relays or other suitable means.

The circuitry for the various components of the control system previously set forth can best be explained by tracing the steps taken in setting up a typical operating arrangement of the press and describing the circuits established to effect each step. In order to set up the press for operation of printing units 1 and 2 into folder A and printing units 3 and 4 into folder B, drive shaft clutches A–1, 1–2, B–3 and 3–4 are closed and clutches 2–B and 4–C are opened. This clutch arrangement will establish mechanical connection of units 1 and 2 and folder A for operation as a unit from shaft 10 by drive motors $M_A$, $M_1$ and $M_2$, and mechanical connection of units 3 and 4 and folder B for operation as a unit from shaft 10 by drive motors $M_B$, $M_3$ and $M_4$.

Next, supervisory switches 78, 80, 82 and 84 must be set in the correct position. Switches 78 and 80 are moved to the left to close contacts $78_A$ and $80_A$. Similarly, switches 82 and 84 are actuated to the left to close contacts $82_B$ and $84_B$. As previously stated, these supervisory switches may be located remote from the other equipment to allow supervisory control over the initial set-up of the press.

Actuation of supervisory switch 78 to the left will energize solenoid 62 of selector switch 24 by establishing a circuit starting at a source of control power 142 and comprising conductors 144, 146, solenoid 62, supervisory switch contacts $78_A$, conductor 148, clutch contacts 116, conductors 150 and 152 back to the source of control power 142. Solenoids 66, 70 and 74 of selector switches 26, 28 and 30 are energized in a similar manner. The energization of solenoids 62, 66, 70 and 74 will close selector switch contacts $24_A$, $26_A$, $28_B$ and $30_B$ to thereby transfer (or connect) the control stations at units 1 and 2 to control bus 48 and the control stations at units 3 and 4 to control bus 50.

The closing of the lowermost selector switch contacts $24_A$, $26_A$, $28_B$ and $30_B$ will energize solenoids 86, 90, 94 and 98 of auxiliary selector switches 54, 56, 58 and 60, respectively. The circuit established by the closure of the lowermost contacts $24_A$ of selector switch 24 to energize solenoid 86 of auxiliary selector switch 54 starts at control power source 142 and includes conductors 152, 154, 155, selector switch contacts $24_A$, conductor 157, solenoid 86, conductor 159, conductors 188, 190, 170, 172 and 144. Similar circuits are completed to energize solenoids 90, 94 and 98 of auxiliary selector switches 56, 58 and 60, respectively.

The energization of the solenoids of the auxiliary switches will close the two sets of auxiliary selector switch contacts $54_A$, $56_A$, $58_B$ and $60_B$ of switches 54, 56, 58 and 60, respectively, to thereby transfer (or connect) power contactors 36 and 38 to control bus 48 and power contactors 42 and 44 to control bus 50.

The system is now set up for control of the group comprising units 1 and 2 and folder A from any of the control stations at those units and folder, and for control of the group comprising units 3 and 4 and folder B from any of the control stations at those units and folder.

Assuming now that it is desired to start drive motors $M_A$, $M_1$ and $M_2$ to drive folder A and units 1 and 2. This is done by closing the start switch 18 at the control station at either folder A, unit 1 or unit 2. Assume that normally open start switch 18 at the folder A control station is closed. A circuit is thereby established from source 142 through conductors 152, 154, 156, normally closed hold contacts 158, conductors 160, start switch 18, conductor 162, normally closed safe switch contacts 164, conductor 166, solenoid 102 of power contactor 34, resistance 168, conductors 170, 172 and 144.

Energization of solenoid 102 will close contacts $34_R$, $34_P$ and $34_M$ (three sets) of power contactor 34. The closing contacts $34_M$ will establish circuits from a power source 174 through a set of three conductors 175, 177 and 179, contacts $34_M$, and a set of three conductors 176, 178 and 180 to drive motor $M_A$.

As previously stated, start switches 18 are of the normally open type. To prevent deenergization of solenoid 102 upon removal of the operator's finger from the push button at start switch 18 of the unit 1 control station, contacts $34_R$ are provided which will establish a run circuit to maintain energization of solenoid 102 after the push button at start switch 18 is released. This circuit starting at source 142 comprises conductors 144, 172, 170, resistance 168, solenoid 102, conductor 166, contacts $34_R$, conductors 182, 184, 156, 154 and 152.

Simultaneously with the energization of solenoid 102 (and the starting of motor $M_A$) solenoids 104 and 106 of power contactors 36 and 38 are also energized to start drive motors $M_1$ and $M_2$. The circuit established for energizing solenoid 104 starting at source 142 comprises conductors 152, 154, 156, 184, pilot contacts $34_P$, conductor 186, lower auxiliary selector switch contacts $54_A$, solenoid 104, upper contacts $54_A$, conductors 188, 190, 170, 172 and 144. Solenoid 106 is energized in a similar manner. The energization of solenoids 104 and 106 of power contactors 36 and 38 will close contacts $36_M$ and $38_M$ to thereby start motors $M_1$ and $M_2$ from high voltage source 174. Thus, motors $M_A$, $M_1$ and $M_2$ are all running with units 1 and 2 operating into folder A.

To start up units 3 and 4 with folder B, clutches B-3 and 3-4 are closed, clutch 4-C is opened, and supervisory switches 82 and 84 are actuated to the left to close contacts $82_B$ and $84_B$, as previously stated. Solenoids 70 and 74 of selector switches 28 and 30 and solenoids 94 and 98 of auxiliary selector switches 58 and 60 are thereby energized and the control system is now ready for control from control stations at either units 3 or 4 or folder B. By depressing the start button at any one of these control stations motors $M_B$, $M_3$ and $M_4$ will be started in the manner previously described with respect to units 1 and 2 and folder A.

To illustrate how the units and folders of any particular operating group may be controlled from the control stations at any of the units or folder in that group, the following situation is assumed. Units 1 and 2 and folder A are being operated as a group by drive motors $M_A$, $M_1$ and $M_2$ (as previously described). Suppose it is desired to stop the operating group and assume that it is desired to stop the group from the control station at unit 1. This can be done by closing normally open stop switch 20 at control station 16 of unit 1 thereby setting up a circuit which shunts out solenoid 102 and opens all contacts of power contactors 34, 36 and 38. This stop circuit starting at source 142 comprises conductors 144, 172 and 170, resistance 168, conductors 200 and 202, selector switch contacts $24_A$ (second from top), conductor 204, stop switch 20 at unit 1 control station, conductors 206, 208 and 210, selector switch contacts $24_A$ (fourth from top), conductors 212, and 160, normally closed solenoid contacts 158, conductors 156, 154 and 152. The resistance 168 in this circuit prevents a short circuit condition when the stop switch 20 is closed.

Safe switch 22 is normally opened as shown in the drawings. If, for any reason, it is desired to prevent the starting of a group of units and folder the safe switch 22 at the control station of any unit or folder in that group is closed. Assume, for example, that while replacing or adjusting the plates of the units in the group comprising units 1 and 2 and folder A it was desired to prevent the inadvertent starting of the motor drives of that group. This could be accomplished by closing the safe switch 22 at the control station at either folder A or units 1 and 2. For purposes of explanation, it will be assumed that the safe switch 22 at the folder A control station is closed. A circuit is thereby established which energizes safe solenoid 214, comprising (from source 142) conductors 152, 154, 156, hold contacts 158, conductor 160, safe switch 22, conductor 216, safe solenoid 214, conductors 190, 170, 172 and 144. Energization of safe solenoid 214 opens safe contacts 164 and thereby prevents the energization of the solenoids of power contactors 34, 36 and 38 which control the operation of drive motors $M_A$, $M_1$ and $M_2$ of folder A and units 1 and 2. As stated previously, safe solenoid 214 could also be energized by closing the safe switch 22 at either the unit 1 or unit 2 control stations.

To illustrate the flexibility of the control systems described above whereby maximum printing capacity can be maintained at all times, the following operating situations are assumed. All illustrations will be described with respect to the operating group comprising folder A and units 1 and 2. Assume, for example, that while the group is operating one of the contacts $24_A$ of selector switch 24 at unit 1 develops a fault and it is desired to isolate the control circuits of that unit to make the necessary repairs while at the same time continue to operate the remaining units and folder of that group. This can be accomplished by moving supervisory switch 78 to the intermediate or open position thereby opening contacts $78_A$ and deenergizing solenoid 62 causing all of the 24 contacts to open. This will deenergize solenoid 104 of power contactor 36, thereby shutting down motor $M_1$ but will not affect the operation and control of drive motors $M_A$ and $M_2$. If it is desired, unit 1 can be maintained in operation since the remaining motors $M_A$ and $M_2$ are designed with sufficient extra capacity to take the extra load. If, however, it is desired to shut down unit 1 when its drive motor $M_1$ is stopped, the power take-off shaft 14 can be disengaged from the main drive shaft by disengaging bevel gears 12. Therefore, in the situation described above, the operating group can continue operation at full capacity under the control of control stations 16 at either folder A or unit 2.

Assume, for example, that a fault develops at contacts $78_A$ of supervisory switch 78 or at solenoid 62 of selector switch 24 making it impossible to actuate the selector switch by electromagnetic means. In such a situation it may be desirable to continue to operate the group comprising folder A and units 1 and 2 with all three of their drive motors until the end of the run at which time repairs may be made. This can be accomplished by manually actuating selector switch 24 (Fig. 5) by moving lever 69 to the left to thereby close contacts 24$_A$. Operation and control of the operating group may then be continued with the same control facilities that existed prior to the fault in the equipment.

The means for preventing a unit from being mechanically connected to one folder while operated electrically from another folder includes the shaft clutches and their associated clutch contacts. Assume that when setting up the press for operation of the folder A and units 1 and 2 as a group (clutches A–1 and 1–2 closed and clutch 2–B open), that selector switch 80 was inadvertently moved to the right closing contacts 80$_B$ instead of to the left to close contacts 80$_A$. The closing of contacts 80$_B$ of supervisory switch 80 will not energize solenoid 68 of selector switch 26 since the clutch switch 126 is opened thereby insuring that unit 2 which has been mechanically coupled to folder A and unit 1 cannot be operated electrically from folder B.

Now suppose in the example given above that instead of supervisory switch 80 being inadvertently moved to the right, that clutch 2–B has inadvertently closed. This would mechanically connect motor M$_B$ to the operating group of M$_A$, M$_1$ and M$_2$, which, in effect, would mean that the drive motors of two folders would be mechanically coupled together. When this situation occurs all the clutch contacts 116 through 126 would be closed. A circuit would thereby be established from source 142 through conductors 152, 150, clutch contacts 116, conductor 192, clutch contacts 120, conductor 194, clutch contacts 124, conductor 196, hold solenoid 198, conductors 172 and 144. The energization of hold solenoid 198 will open hold contacts 158 and thereby prevent the establishment of the energization circuit for solenoid 102 to prevent starting any of the drive motors M$_A$, M$_1$ or M$_2$.

Additional flexibility is provided by manually operated disconnect switches 217 at each of the folder control stations to permit selective immobilization of a folder control station in an operating group (if a fault should develop therein) without otherwise affecting the operation of the group. Similarly, the folder motors may be selectively deenergized without affecting the operation of the printing unit motors in a group by manually operated folder motor switches 219 (one at each folder motor). If for any reason a fault should develop in a folder motor, the defective motor can be deenergized by its switch 219, while the folder continues in operation (driven by the printing unit motors in the group). If desired, the operation of switches 217 and 219 at each folder can be tied together by a solenoid or other suitable means so that by opening or closing one or the other of the switches manually the other will be actuated automatically.

It should be noted in the control system previously described that the controller assembly 32 generally located at any convenient place remote from the press is connected to the control stations and selector switches located at the units and folders. Where previously all control wiring was brought back to the controller assembly for selection of grouping, this is done in my control system adjacent to the press with only a single set of wires (control busses 48, 50 and 52) per control group being returned to the controller assembly where the circuits are redistributed to the duplicate components as required by the particular combination. This system reduces the amount of wiring required to connect the control instrumentalities located at or adjacent the folders and printing units with the controller assembly. A substantial cost saving and a simplified control results.

A modification of the control system (Figs. 3 and 4) allows greater capacity for printing color. Printing color requires a separate printing unit to print each color of a multi-color picture. To provide the extra capacity (per group) required, a folder skip selector switch is used (Figs. 3 and 4) to skip or bypass folder B to thereby allow units 1, 2, 3 and 4 to be operated as a group into folder C.

With the folder skip selector switch 220 in its normal position as shown on the drawings, the printing press with the modified control system (Figs. 3 and 4) can be operated in the same manner as that previously described (Figs. 1 and 2). Assume, however, that it is desired to operate units 1, 2, 3 and 4 into folder C. This means that in the arrangement shown there will be four units operating into a single folder. This, of course, could be accomplished without the skip modification by operating units 1, 2, 3 and 4 into folder B. It must be kept in mind, however, that the arrangement shown has been greatly simplified and that in a metropolitan type printing press there would be a plurality of printing units positioned to the right of folder C which could be operated into folder C. The modification, in effect, increases the number of printing units that can be operated into folder C by the number of printing units positioned between folders A and B.

To set up the press for operation of units 1, 2, 3 and 4 into folder C, line shaft clutch A–1 is opened and clutches 1–2, 2–B, B–3, 3–4 and 4–C are closed. The bevel gears 12 at folder B may be disengaged since folder B will not be used in this operation. With the clutches arranged as stated, the actuating arm 222 of skip selector switch 220 is moved downwardly to the skip or bypass position. Supervisory switches 78, 80, 82 and 84 are actuated to the right to close contacts 78$_B$, 80$_B$, 82$_C$ and 84$_C$, respectively. This establishes energizing circuits for solenoids 64, 68, 72 and 76 of the selector switches thereby transferring or connecting all control stations to control bus 52. It is noted that the connections between the units 1 and 2 control stations and control bus 52 bypass control bus 50 by means of skip selector switch 220. The energization of the selector switch solenoids establishes energizing circuits for solenoids 88, 92, 98 and 100 of auxiliary selector switches 54, 56, 58 and 60, respectively, to thereby transfer power contactors 36, 38, 42 and 44 to control bus 52. Here again the connections between the units 1 and 2 power contactors and control bus 52 bypass control bus 50 by means of skip selector switch 220. The press is now set up for operation of units 1 through 4 into folder C with the operating group under the control of the control station at any of those units and folder.

The drive motors can be started by closing start switch 18 at the unit 1 control station which establishes a circuit (starting at source 142 at control bus 52) comprising conductors 224, 226, 228, hold contacts 230, conductor 232 of control bus 52, conductor 234, skip selector switch contacts 236, conductor 238, contacts 24$_B$ of selector switch 24, conductors 208, 206, 207, start switch 18, conductor 240, conductor 242, contacts 24$_B$, conductor 244, skip selector switch contacts 246, conductor 248, conductor 250, safe switch contacts 252, conductor 254, solenoid 114, resistance 256, conductors 258, 260, 262 and 264. The energization of solenoid 114 of power contact 46 starts drive motor M$_C$. Solenoids 110 and 112 of power contactors 42 and 44 are energized directly following energization of solenoid 114 to start units 3 and 4 drive motors M$_3$ and M$_4$ in the manner previously described with reference to the control system shown on Figs. 1 and 2. Solenoids 104 and 106 of power contactors 36 and 38 are also energized to start units 1 and 2 drive motors M$_1$ and M$_2$. The circuit for energizing solenoid 104 of power contactor 36 for drive motor M$_1$ starting at source 142 comprises conductors 224, 226, 228, 266, pilot contacts 46$_P$, conductors 268, 270, skip selector switch contacts 272, conductors 274, 276, lower contacts 54$_B$ of auxiliary selector switch 54, solenoid 104, upper contacts 54$_B$, conductors 278, 280, skip selector switch contacts 282, conductors 284, 286, 288, 290, 258, 260, 262 and 264. Solenoid 106 of power contractor 38 is energized in a similar manner thereby starting motor M$_2$. Units 1, 2, 3 and 4 are now operating into folder C.

It is noted that hold solenoid 294 which would normally be energized when the drive motor $M_C$ is mechanically coupled to the drive motor $M_B$ will not be energized when the previously described skip operation is set up. Hold solenoid 294 will, however, be energized if in the skip operation the line shaft clutch A-1 is inadvertently closed to thereby mechanically couple motor drive $M_A$ with motor drive $M_C$. Energization of hold solenoid 294 as previously explained (with respect to hold solenoid 198) will prevent energization of the power contactors and make it impossible to start the drive motors. Assume, for example, that in the skip operation previously described the line shaft clutch A-1 is inadvertently closed mechanically coupling drive motor $M_A$ with drive motor $M_C$. If this happens, hold solenoid 294 will be energized by the circuit starting at source 142 and comprising conductors 264, 262, 260, hold solenoid 294, conductors 296, 298, skip selector switch contacts 300, conductor 302, clutch contacts 118, conductor 304, clutch contacts 122, conductor 306, clutch contacts 126, conductor 308, skip selector switch contacts 310, conductors 312, 314, clutch contacts 130, conductor 315, clutch contacts 134, conductor 316, clutch contacts 138, conductors 318 and 224. The energization of hold solenoid 294 will open hold contacts 230 and prevent the energization of solenoid 114 of power contactor 46 and the starting of any of the drive motors.

I claim:

1. A control system for a printing press having printing units and folders and driving means for said units and folders to drive each folder and its associated units as separate groups comprising, a control station for each folder and printing unit, control means including a drive controller for each of said folders and printing units, a control bus connected between each folder control station and folder drive controller and a selector switch for each printing unit control station for transferring said printing unit control stations between adjacent control busses to thereby control the driving means of each of said separate groups from any of the control stations of the same group and to permit selective isolation of the control circuitry of any printing unit in a group without affecting the operation and control of the remaining units and folder in that group, and switch means for bypassing one of said adjacent control busses to permit transferring the printing unit control stations intermediate said adjacent control busses between the other of said adjacent control busses and a remote control bus connected to the folder adjacent said bypassed control bus.

2. In a control system for a printing machine having three folders, a first plurality of printing units operable into either of said first, second or third folders, a second plurality of printing units operable into either of said second or third folders, driving means for said units and folders to drive each folder and its associated units as separate groups comprising, a control station for each folder and printing unit, control means to control the driving means of each of said separate groups from any of the control stations of the same group including a drive controller for each of said folders and printing units, a control bus connected between each folder control station and folder drive controller, and a selector switch for each printing unit control station for transferring said printing unit control stations at said first plurality of printing units between said control busses connected to said first and second folders and for transferring said control stations at said second plurality of printing units between said control busses connected to said second and third folders, and switch means for bypassing the control bus connected to the control station at said second folder to permit said first plurality of printing unit control stations to be transferred between the control busses connected to the control stations at the first and third folders.

3. A control system according to claim 2 in which said control means further includes a plurality of auxiliary selector switches one for each printing unit drive controller for transferring said drive controllers for said first plurality of printing units between said control busses connected to said first and second folders and for transferring said drive controllers for said second plurality of printing units between said control busses connected to said second and third folders, and switch means to bypass the control bus connected to the second folder control station to permit said first plurality printing unit drive controllers to be transferred between the control busses connected to the control stations at the first and third folders.

4. A control system for a printing press having printing units and folders and driving means including a drive shaft and a plurality of drive shaft clutches based along said drive shaft for mechanically coupling said driving means, folders and printing units together to drive each folder and its associated printing units as separate groups comprising, switch means actuated in response to the opening and closing of said drive shaft clutches, control means for controlling the operation of said driving means responsive to said switch means to prevent operating said folders and units when two folders are mechanically coupled together, said control means further including a hold switch for each separate group of units and folder actuated by electromagnetic means energized in response to actuation of said switch means.

5. A control system for a printing press having printing units and folders and driving means for said units and folders to drive each folder and its associated units as separate groups comprising a control station for each folder and printing unit, control means including a drive controller for each of said folders and printing units, a control bus connected between each folder control station and folder drive controller and a selector switch for each printing unit control station for transferring said printing unit control stations between adjacent control busses to thereby control the driving means of each of said separate groups from any of the control stations of the same group and to permit selective isolation of the control circuitry of any printing unit in a group without affecting the operation and control of the remaining units and folder in that group, said control means further including electromagnetic means to actuate said selector switch, a supervisor switch for each selector switch, and manual means to alternatively actuate each of said selector switches.

6. A control system for a printing press having printing units and folders and driving means for said units and folders comprising, a control station for each unit and folder, a controller assembly for said driving means, folder motor controllers in said assembly connected to the control stations of each folder, unit motor controllers in said assembly for each unit, and a separate supervisor switch controlled circuit for each unit to connect the control station and the unit motor controller of a unit alternatively to said folder motor controllers and to completely disconnect the unit motor controller from the unit independently of all other unit control stations and motor controllers, said supervisor controlled circuits including a selector switch for each unit and an auxiliary selector switch for each unit motor controller, said auxiliary selector switches being under the control of said selector switches to insure that the control station and unit motor controller for a particular unit are both connected to the same folder motor controller, said selector switches being electromagnetically controlled and having manual means for emergency operation.

References Cited in the file of this patent
UNITED STATES PATENTS

| | | |
|---|---|---|
| 1,176,542 | Goldenstein | Mar. 21, 1916 |
| 1,616,760 | Rodman et al. | Feb. 8, 1927 |
| 2,423,028 | Horton et al. | June 24, 1947 |
| 2,683,246 | Priban | July 6, 1954 |
| 2,944,644 | Sandgren et al. | July 12, 1960 |